United States Patent Office 2,825,650
Patented Mar. 4, 1958

2,825,650

MEAT-FLAVORING CONDIMENT

Bahman K. Shahrok, Berkeley, Calif., assignor of twenty-five percent to Ruth M. Chesbro, Berkeley, and fifty percent to Beverly E. Williams, San Mateo, Calif.

No Drawing. Application May 12, 1955
Serial No. 507,969

3 Claims. (Cl. 99—143)

This invention relates to condiments, and particularly to condiments for enhancing the flavor of the "red meats" such as beef, mutton, venison and the like.

Most epicures will agree that the flavor as well as the tenderness of the red meats is greatly improved by aging or "hanging" the meats for some time before they are cooked and eaten. There is considerable disagreement as to what agency is responsible for the improvement in flavor, it having been asserted, by various authorities, that it is due to an autolytic process by an enzyme natural to the meat itself or that it is the result of the growth of a fungus upon the meat. The particular fungus most often found on meats which have been "hung" is Thamnidium, and various authorities believe that this is responsible for the improved flavor.

It is frequently impossible to obtain meats which have been hung for a sufficient length of time to acquire the desired flavor. Upon the theory that it was the fungus that was responsible, attempts have been made to supply the flavor artificially by desiccating the mycelium of Thamnidium and using it upon the meat in the same manner as salt or pepper would be used, prior to, during, or immediately subsequent to the cooking. The results of these efforts have been disappointing, the product, when applied in this manner, being substantially tasteless.

The objects of this invention are to provide a condiment which will give to meats a flavor which is substantially similar to that developed by hanging the meat under proper refrigeration for a considerable length of time; to provide a condiment which will keep indefinitely; to provide a means of supplying the flavor in any desired degree and to provide a condiment to which other spices, flavorings, or taste enhancers may be added without deterioration of the flavor which is primarily desired.

The condiment which is the subject of this invention, comprises primarily, the dried and finely divided mycelium of *Aspergillus niger*. This material is preferably mixed with a diluent and preservative, the preferred mixture being equal parts by weight of finely ground *Aspergillus mycelium* and sodium chloride or common salt. If desired there may be added to this basic mixture other flavorings, such as pepper and other spices or "taste enhancers" such as monosodium glutamate.

The raw material for the mixture is readily obtainable. A number of processes have been developed whereby a solution of sugars of various kinds is inoculated with *Aspergillus niger* for the purpose of producing citric acid. A mat consisting primarily of the mycelium of the fungus grows on top of the solution and through reactions which are not thoroughly understood the sugars are converted, to a greater or less extent, to citric and oxalic acids.

There is evidence that the efficacy of the fungus in effecting the conversion falls off rapidly when it starts to sporulate. When this occurs the mat is removed, the material is placed in a filter press and the moisture, including the acid and remaining sugars, is expressed from it insofar as possible, and the mycelium mat becomes a waste product which is available in large quantities. The mycelium mat may or may not be washed prior to the filtering in order to remove as much as possible of the sugar and citric acid solution, but whether it has been treated in this manner or not appears to make no difference in the flavor of the resultant product.

The resultant mat or filter cake, which may be obtained in this fashion, is thoroughly dried and is then ground to the desired particle size. How far the grinding is carried is very largely a matter of personal choice. It may be either fairly coarse particles, comparable in size to the coarsely ground pepper supplied from the hand mills which are familiar on many tables, or it may be completely pulverized. The preferred size of particle is approximately the same as is found in ordinary table salt.

The preferred basic mixture for the condiment of this invention is the ground mycelium thus described with a substantially equal amount, by weight, of table salt, the two ingredients being thoroughly mixed. The proportions are not at all critical, but the average taste seems to be best met by those mentioned; enough of the mixture to salt to taste the meat to which it is applied supplying sufficient Aspergillus flavor to give the meat the required zest.

Cooking does not ordinarily have any material effect upon the flavor as long as it is not carried so far as to char the Aspergillus. The condiment can therefore be applied either before, after, or during cooking.

The basic mixture described is stable as long as it is kept dry and does not require refrigeration either to prevent decay or sporulation and growth. The salt is an adequate preservative, as well as flavoring and no other preservatives are necessary.

If desired, other flavoring matters or taste enhancers can, of course, be added to the basic condiment here described, including pepper or other spices and monosodium glutamate.

The condiment of this invention is not a tenderizer, but affects the flavor only. It can, of course, be applied to "tenderized" meat if desired.

It is not, of course, necessary that Aspergillus which has been used for the production of citric acid be employed in the practice of the present invention. The fungus can be cultivated specifically for the purpose of preparing the condiment, but because of the ready availability of the Aspergillus mats as a byproduct, substantially all of which is now wasted, the byproduct mats are the logical source of supply.

Having thus described the invention, what is claimed is as follows:

1. A condiment comprising a mixture of the dried and finely divided mycelium of *Aspergillus niger* and a diluent having sodium chloride as a major component thereof.

2. A condiment comprising a mixture of the dried and finely divided mycelium of *Aspergillus niger* and sodium chloride.

3. A condiment having as its principal components the dried and finely divided mycelium of *Aspergillus niger* and sodium chloride.

References Cited in the file of this patent

UNITED STATES PATENTS

| | | |
|---|---|---|
| 2,140,781 | Allen | Dec. 20, 1938 |
| 2,221,689 | Jensen | Nov. 12, 1940 |

OTHER REFERENCES

"Microbiology of Meats," by L. B. Jensen, The Garrard Press, Champaign, Illinois, 1945, second edition, pages 161 and 248–250.

"The Chemistry and Technology of Enzymes," by Tauber, John Wiley and Sons, Inc., New York, 1949, page 401.